United States Patent
Rodriguez et al.

(10) Patent No.: US 7,200,857 B1
(45) Date of Patent: Apr. 3, 2007

(54) SYNCHRONIZED VIDEO-ON-DEMAND SUPPLEMENTAL COMMENTARY

(75) Inventors: Arturo A. Rodriguez, Norcross, GA (US); Dean F. Jerding, Roswell, GA (US); Robert O. Banker, Cumming, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 550 days.

(21) Appl. No.: 09/693,780

(22) Filed: Oct. 20, 2000

Related U.S. Application Data

(63) Continuation-in-part of application No. 09/590,520, filed on Jun. 9, 2000, now Pat. No. 7,010,801.

(60) Provisional application No. 60/214,987, filed on Jun. 29, 2000.

(51) Int. Cl.
*H04N 7/173* (2006.01)

(52) U.S. Cl. ........................................ 725/87; 725/136

(58) Field of Classification Search .................... 725/8, 725/87, 139, 34, 24, 136
See application file for complete search history.

(56) References Cited

U.S. PATENT DOCUMENTS

| | | | | |
|---|---|---|---|---|
| 5,532,735 A | * | 7/1996 | Blahut et al. | 725/32 |
| 5,694,163 A | * | 12/1997 | Harrison | 725/110 |
| 5,696,905 A | * | 12/1997 | Reimer et al. | 705/27 |
| 5,838,314 A | * | 11/1998 | Neel et al. | 725/8 |
| 5,861,881 A | * | 1/1999 | Freeman et al. | 715/500.1 |
| 5,861,906 A | * | 1/1999 | Dunn et al. | 725/87 |
| 5,905,865 A | * | 5/1999 | Palmer et al. | 725/112 |
| 5,907,323 A | * | 5/1999 | Lawler et al. | 725/41 |
| 6,020,912 A | * | 2/2000 | De Lang | 725/91 |
| 6,081,830 A | * | 6/2000 | Schindler | 709/204 |
| 6,108,706 A | * | 8/2000 | Birdwell et al. | 709/229 |
| 6,184,877 B1 | * | 2/2001 | Dodson et al. | 725/110 |
| 6,263,501 B1 | * | 7/2001 | Schein et al. | 725/39 |
| 6,282,713 B1 | * | 8/2001 | Kitsukawa et al. | 725/36 |
| 6,317,881 B1 | * | 11/2001 | Shah-Nazaroff et al. | 725/24 |
| 6,324,694 B1 | * | 11/2001 | Watts et al. | 725/32 |
| 6,326,982 B1 | * | 12/2001 | Wu et al. | 345/718 |
| 6,378,130 B1 | * | 4/2002 | Adams | 725/95 |
| 6,408,128 B1 | * | 6/2002 | Abecassis | 386/68 |
| 6,512,552 B1 | * | 1/2003 | Subramanian | 348/564 |
| 6,601,103 B1 | * | 7/2003 | Goldschmidt Iki et al. | 709/231 |
| 6,628,302 B2 | * | 9/2003 | White et al. | 715/717 |
| 6,675,388 B1 | * | 1/2004 | Beckmann et al. | 725/136 |
| 7,010,492 B1 | * | 3/2006 | Bassett et al. | 705/1 |
| 2002/0042920 A1 | * | 4/2002 | Thomas et al. | 725/87 |

OTHER PUBLICATIONS

Tabuchi et al, "A Proposal of TV Community System that enables users to build and maintain a community associated with the time-line of TV program", NEC C&C Meida Research Laboratories, pp. 441-446 (1999).*

* cited by examiner

*Primary Examiner*—Scott E. Beliveau

(57) ABSTRACT

A method for providing media to a user via an interactive media services client device coupled to a programmable media services server device includes receiving user input requesting on-screen comments to be provided with a media presentation and providing the user with a media presentation along with comments related to the media presentation.

17 Claims, 11 Drawing Sheets

SYNCHRONIZED VIDEO-ON-DEMAND SUPPLEMENTAL COMMENTARY

CROSS-REFERENCE TO RELATED APPLICATIONS

This application is a continuation-in-part of application Ser. No. 09/590,520, filed on Jun. 9, 2000, now U.S. Pat. No. 7,010,801, and claims the benefit of U.S. Provisional Application No. 60/214,987, filed on Jun. 29, 2000, both of which are entirely incorporated herein by reference.

FIELD OF THE INVENTION

This invention relates in general to television systems, and more particularly, to the field of media on demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the set-top box, has become an important computing device for accessing video services and navigating a subscriber through a maze of available services. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

As the number of video-on-demand movie choices increases, it is becoming increasingly important for video-on-demand providers to distinguish their video presentations by providing viewers with more options or features, along with the video-on-demand presentations, that will make the viewing experience more entertaining for the viewers. In addition, many viewers today are interested in knowing more about the movies that they are watching but simply do not have enough free time to locate and read such information. Therefore there exists a need to make the video-on-demand viewing experience more informative and entertaining.

SUMMARY OF THE INVENTION

The preferred embodiment of the invention can be viewed as a method for providing media to a user via an interactive media services client device coupled to a programmable media services server device, the method including steps of receiving user input requesting on-screen supplementary information be provided with a media presentation and providing the user with a media presentation along with supplements valid during applicable time intervals of the media presentation.

BRIEF DESCRIPTION OF THE DRAWINGS

The invention can be better understood with reference to the following drawings. The components in the drawings are not necessarily drawn to scale, emphasis instead being placed upon clearly illustrating the principles of the present invention. In the drawings, like reference numerals designate corresponding parts throughout the several views.

DETAILED DESCRIPTION OF THE PREFERRED EMBODIMENT

Figure 1:
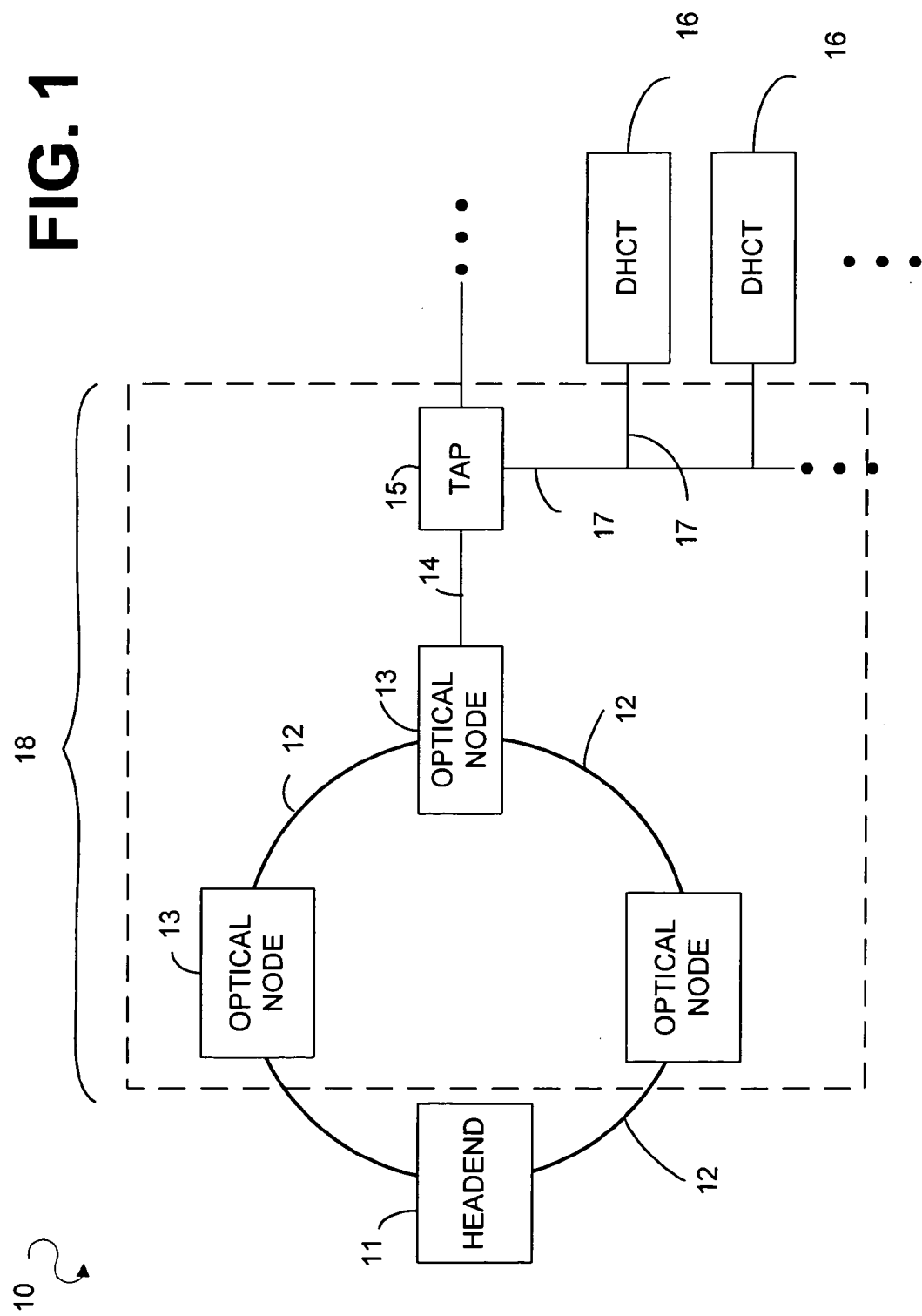
FIG. 1 depicts a block diagram of a cable television system in accordance with one preferred embodiment of the present invention.

FIG. 1 is a block diagram of a cable television system 10 that includes a headend 111 connected through a network 18 to multiple DHCTs 16. The headend 111 receives and generates television signals and transmits them as optical signals over fiber optic cables 12. One or more optical nodes 13 are included in the system 10 for converting the optical signals to Radio Frequency (RF) signals that are thereafter routed over other media, such as coaxial cables 14. Taps 15 are provided within the cable system 10 for splitting the RF signal off, via cables 17, to subscriber equipment such as DHCTs 16, cable-ready television sets, video recorders, or computers. It should be appreciated, however, that the cable television system 10 shown in FIG. 1 is merely illustrative and should not be construed as implying any limitations upon the scope of the present invention.

Figure 2:
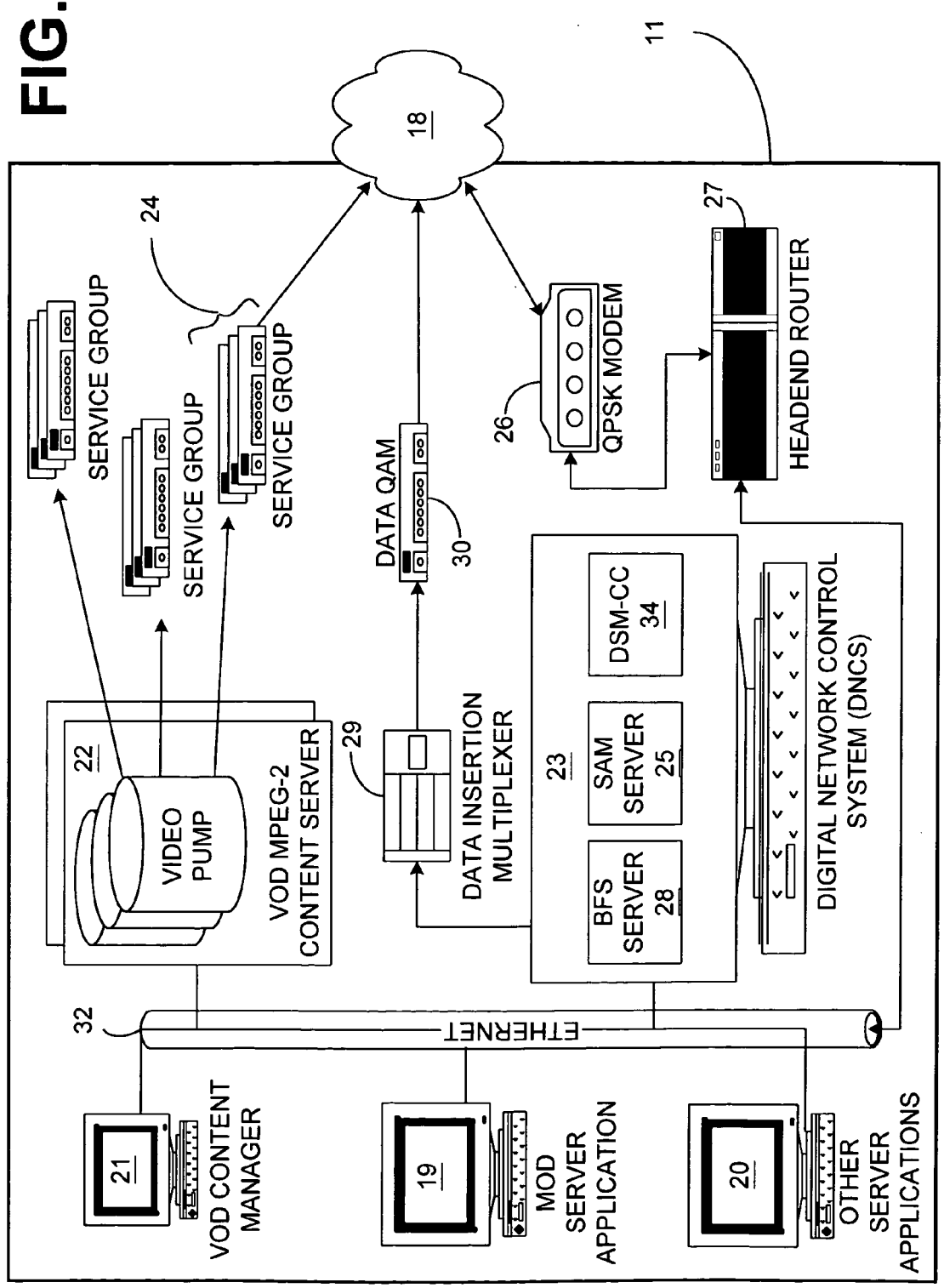
FIG. 2 depicts a diagram of the headend 11 as depicted in FIG. 1.

FIG. 2 is a block diagram of portions of a headend 11 that is configured to provide media-on-demand (MOD) services in accordance with one embodiment of the present invention. MOD services include, among other things, video-ondemand (VOD) services and respective MOD information suitable to be presented to a user via display of an interactive media guide. MOD server application 19 and a plurality of other server applications 20 are connected to a digital network control system (DNCS) 23 via a high-speed network such as an Ethernet connection 32. The MOD server application 19 is responsible for reserving and configuring system resources needed to provide MOD services and for providing configuration and service data to an MOD client application 63 (FIG. 3), including MOD information comprising a catalog of titles available for on-demand viewing and/or on-demand rental by a user.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary. MPEG-2 transport may be used to multiplex video, audio, and data in digital transmission channels such as channels transmitted downstream employing quadrature amplitude modulation (QAM). An MPEG-2 transport stream allows multiplexing of digital video, digital audio, and data. Multiple different video programs, each with one or more digital video streams, one or more digital audio streams, and/or multiple data streams can be multiplexed and transmitted over the same 6 MHz (or 8 MHz) RF frequency in which the DHCT's tuner tunes to. Hence, a digital transmission channel can carry the video, audio and data streams of programs of multiple television (TV) stations or on-demand video programs.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
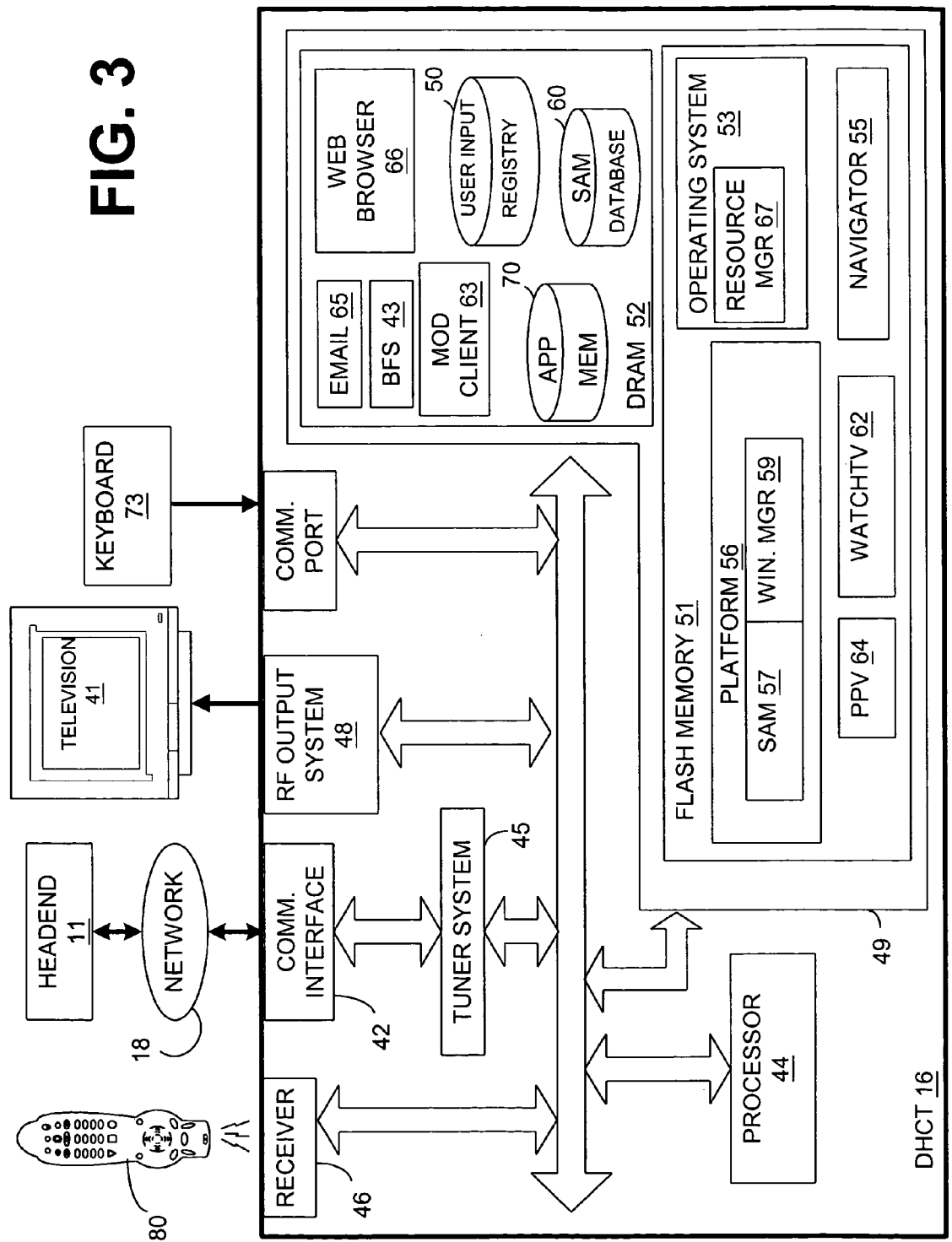
FIG. 3 depicts a block diagram of selected elements of a DHCT and related equipment, in accordance with one preferred embodiment of the present invention depicted in FIG. 1.

FIG. 3 is a block diagram illustrating a DHCT 16 that is coupled to a headend 11 and to a television 41. Some of the functionality performed by applications executed in the DHCT 16 (such as the MOD client application 63) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager client (SAM) 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services. Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

The MOD client application 63 provides the user with lists of available media titles to choose from and with video presentations requested by the user. The MOD client application 63 provides video presentations to the user by engaging, preferably, in a direct two-way IP (Internet protocol) connection with VOD content servers 22 (FIG. 2).

Figure 3A:
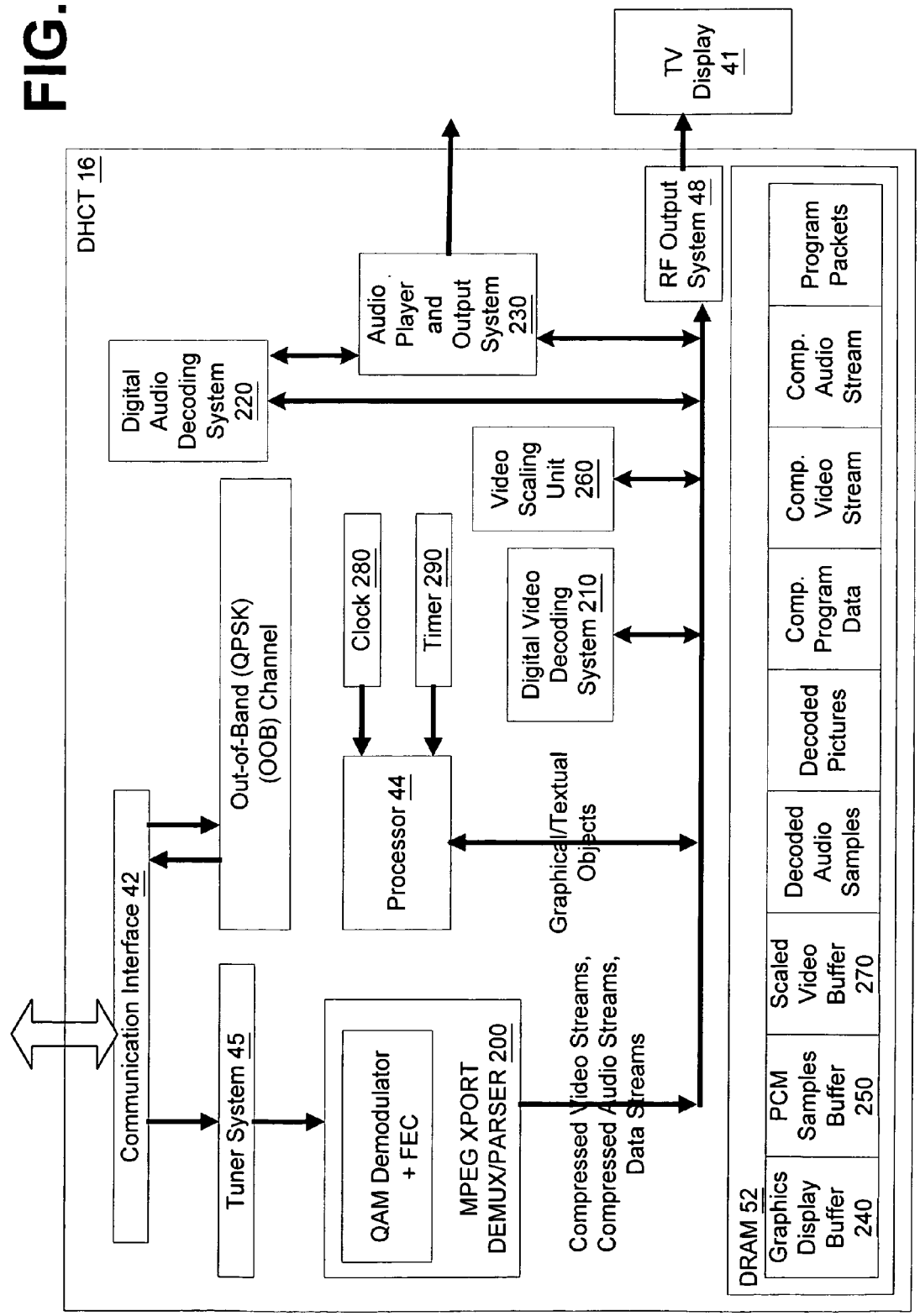
FIG. 3A is another depiction of a block diagram of selected elements of a DHCT in accordance with one preferred embodiment of the present invention depicted in FIG. 1.

FIG. 3A is another depiction of selected elements of DHCT 16. DHCT 16 includes a tuner system 45 that can select one of a plurality of transmission channels provided by a broadband network such as a Digital cable TV network or a Digital Broadband Delivery System (DBDS). Tuner system 45 enables the DHCT of the present invention to tune to downstream media and data transmissions, thereby allowing a user to receive digital or analog video programs and associated content transmitted in the downstream transmission via the DBDS.

The DHCT 16 includes demultiplexing system 200 comprising functionality for QAM demodulation, forward error correction (FEC), transport demultiplexing and parsing. Transport demultiplexing may include MPEG-2 transport demultiplexing. The DHCT 16 also includes a digital video decoding system 210, a digital audio decoding system 220, a display output system such as RF output system 48, an "audio player and output system" 230 that can feed audio samples to RF output system 48, and a processor 44.

The demultiplexing system 200 in communication with communication interface 42, tuner system 45 and processor 44 effects reception of compressed video streams, compressed audio streams, and data streams corresponding to a first video program to be separated from other programs and/or streams transported in the tuned transmission channel and to be stored in a first part of DRAM 52 of DHCT 16 assigned to receive packets of a first video program.

The demultiplexing system 200 in communication with the digital video decoding system 210 and processor 44 effect notification and/or transfer of received packets of one or more compressed video streams corresponding to a first video program from a first part of DRAM 52 to a second part of DRAM 52 assigned to digital video decoding system 210.

The demultiplexing system 200 in communication with the digital audio decoding system 220 and processor 44 effects notification and/or transfer of received packets of one or more compressed audio streams corresponding to a first video program from a first part of DRAM 52 to a third part of DRAM 52 assigned to digital audio decoding system 220.

The demultiplexing system 200 in communication with processor 44 and/or other data parsing and interpretation device (not shown) in DHCT 16 effects notification and/or transfer of received packets of one or more data streams corresponding to a first video program from a first part of DRAM 52 to a fourth part of DRAM 52 assigned for reception of data affiliated with a first video program.

The digital video decoding system 210 reads compressed video stored in a second part of DRAM 52 assigned to digital video decoding system 210 and effects decompression and reconstruction of compressed digital video streams into an assigned fifth part of DRAM 52, and in communication with the display output system (such as RF output system 48) effects presentation of video pictures in television 41.

The digital audio decoding system 220 reads compressed audio stored in a third part of DRAM 52 assigned to the digital audio decoding system 220 and effects decompression and reconstruction of compressed digital audio streams into an assigned sixth part of DRAM 52, and in communication with the audio player and output system 230 effects presentation of audio sample to television 41 and/or other audio output interfaces (not shown) in DHCT 16.

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and can be transferred into DRAM 52 for execution. Likewise, data input for an executable program can reside in flash memory 51 or a storage device and can be transferred into DRAM 52 for use by an executable program or algorithm. In addition, data outputted by an executable program can be written into DRAM 52 by an executable program or algorithm and can be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
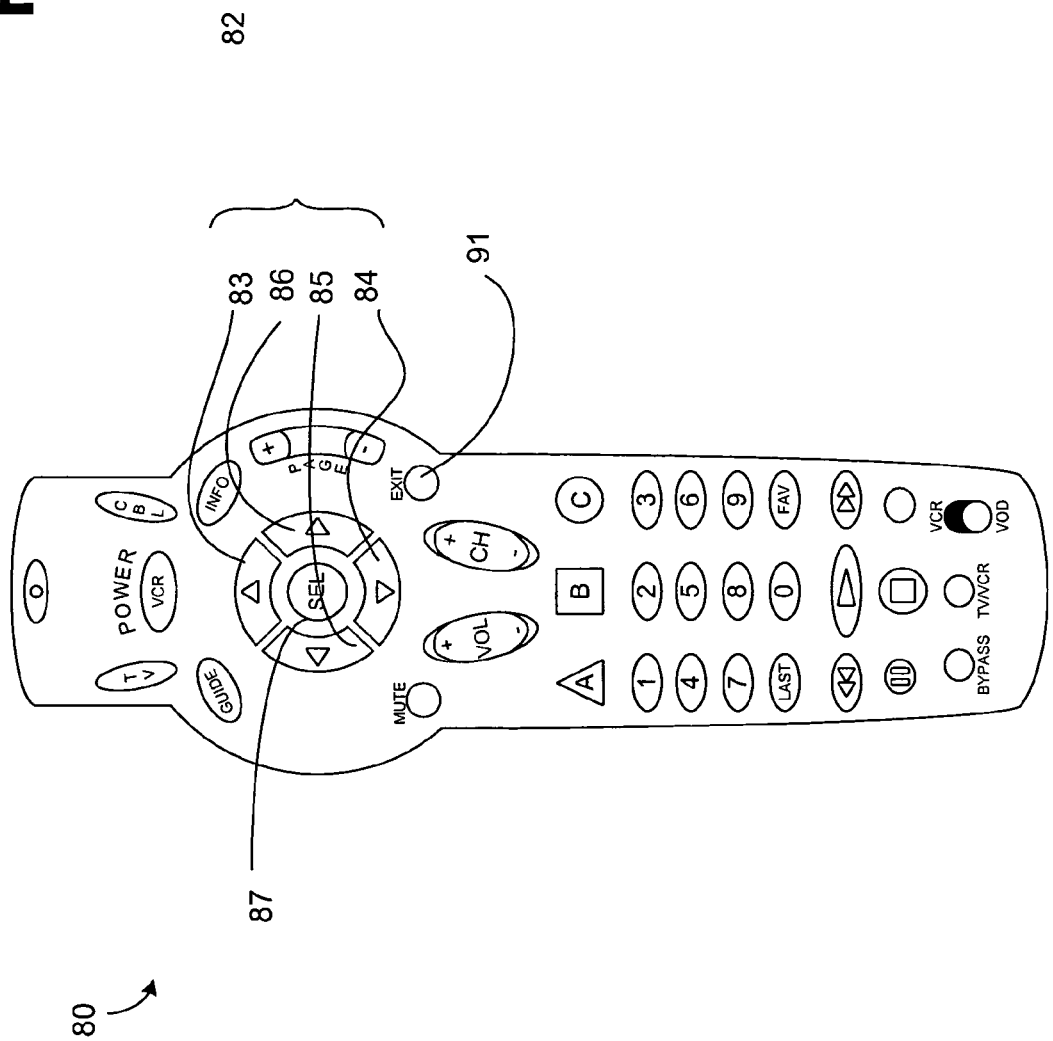
FIG. 4 depicts a remote control device that can be used to provide user input to the DHCT shown in FIG. 3.

FIG. 4 is a non limiting example of a remote control device 80 that is used to provide user input to the DHCT 16. The arrow buttons 82 include an up arrow button 83, a down arrow button 84, a left arrow button 85, and a right arrow button 86 that are used to scroll through options and/or to highlight an option. The select button 87 may be used to select a currently highlighted option that is provided to the user. Other buttons that are available on the remote control device will be discussed further below. Many alternative methods of providing user input may be used including a remote control device with different buttons and/or button layouts, a keyboard device, a voice activated device, etc. The invention described herein is not limited by the type of device used to provide user input.

Figure 5:
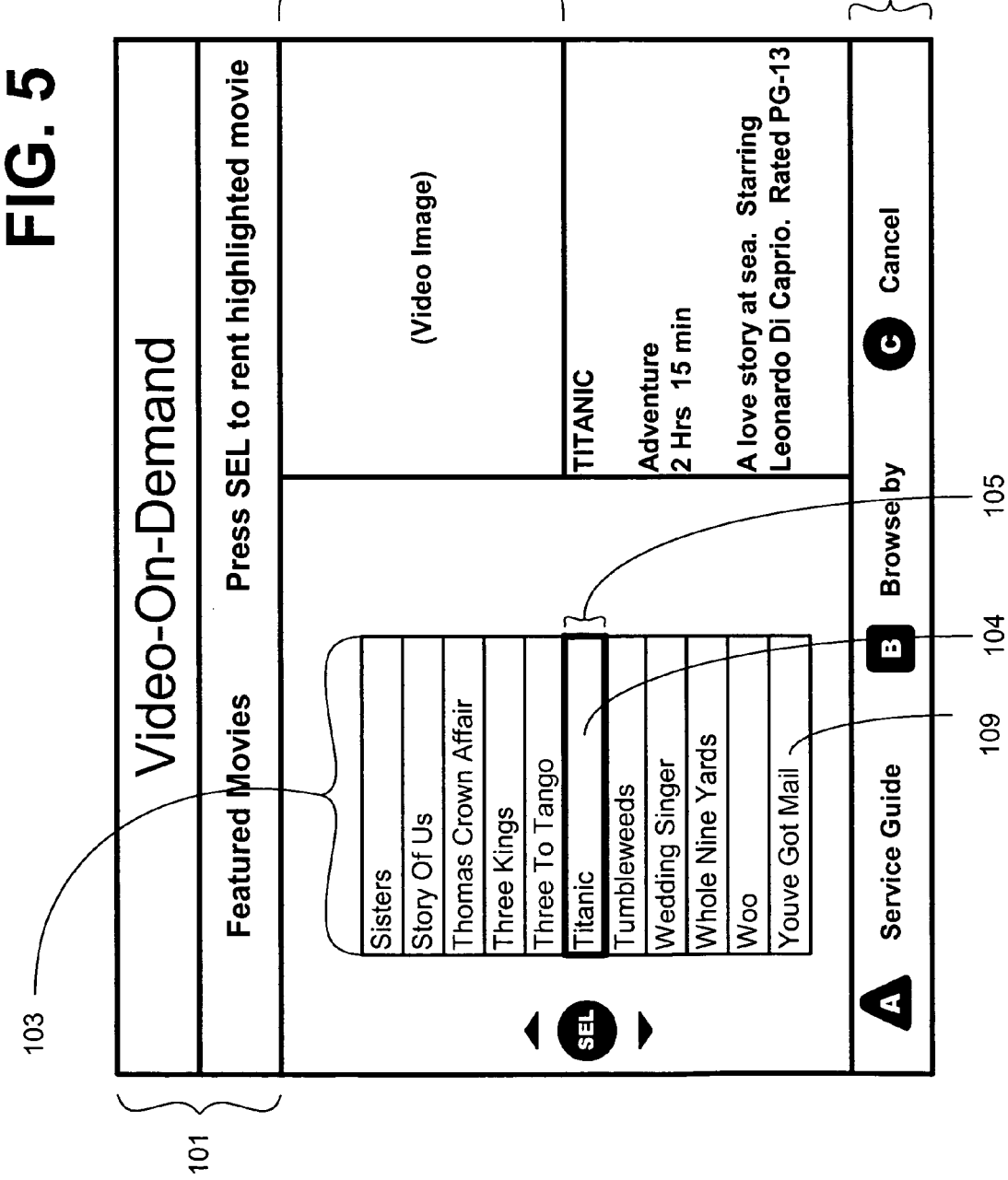
FIG. 5 depicts an example video-on-demand (VOD) rental selection window that illustrates a media rental list presented to the user by the DHCT shown in FIG. 3.

With continued reference to FIGS. 3, 3A and 4 throughout the remaining figures, FIG. 5 depicts an example VOD rental selection window 100. As with other window examples discussed below, processor 44 executes program instructions of MOD client application 63 that cause it to direct the window manager 59 to create window 100 via, display data that is formatted for television 41. Processor 44 stores the display data or parts thereof in DRAM 52 (as necessary) and transfers the display data to a display output system such as RF output system 48 wherein display data is converted to respective television signals and transmitted to television 41. Of course, the scope of the invention also includes any other method of causing the described windows to appear to the user.

A user may utilize the rental selection window 100 in order to request a video-on-demand rental. Top portion 101 of example window 100 typically contains one or more headings, while the bottom portion 102 typically illustrates relevant navigation buttons available on the remote control device 80. Video rental list 103 contains the titles of video presentations, such as video title 104, that are available for rent as well as a highlighted title area 105.

A user may scroll through the video rental list using the up and down arrow buttons 83, 84 on the remote control device 80 and may request a currently highlighted video title by activating the select button 87. For example, a user may activate the down arrow button 84 on the remote control device 80 until the selection "You've Got Mail" 109 is displayed in the highlighted title area 105 and then request to see the video titled "You've Got Mail" 109 by activating the select button 87. In an alternative embodiment, activating the up and down arrow buttons 83, 84 on the remote control device 80 results in the shifting of the highlighted title area 105 rather that the shifting of the video titles (at least until the top or bottom video titles are reached). A reduced screen area 106 displays an image corresponding to the video title displayed in the highlighted title area 105. As the user scrolls through the video rental list 103, the image displayed in the reduced screen area 106 changes accordingly. Without any limitation to other scrolling and selection forms, the scrolling and selection mechanism described above is similarly applicable to other lists and windows herein.

Figure 6:
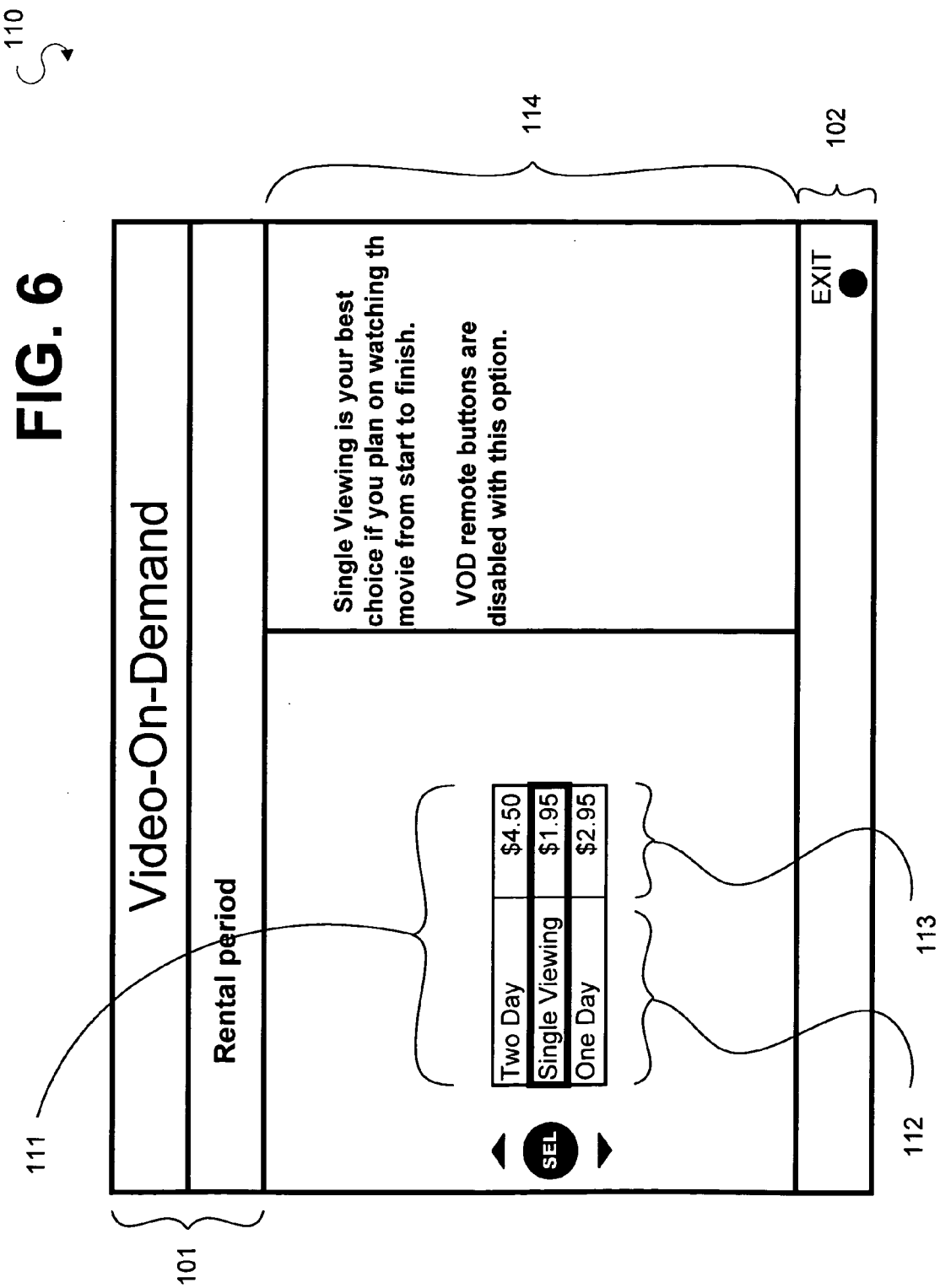
FIG. 6 depicts an example rental period selection window that is presented to the user after the user selects a media rental via the rental selection window shown in FIG. 5.

FIG. 6 depicts an example rental period selection window 110 that is presented to a user after the user selects a movie from the rental selection window 100. The user is presented with a rental period list 111 containing rental periods 112, rental prices 113, and a highlighted selection area 113. Rental period information section 114 provides information about the rental period displayed in the highlighted selection area. A user may scroll to the desired rental period until it becomes highlighted and may then select a highlighted rental period by activating the select button 87 or may cancel the rental request by activating the exit button 91.

Figure 7:
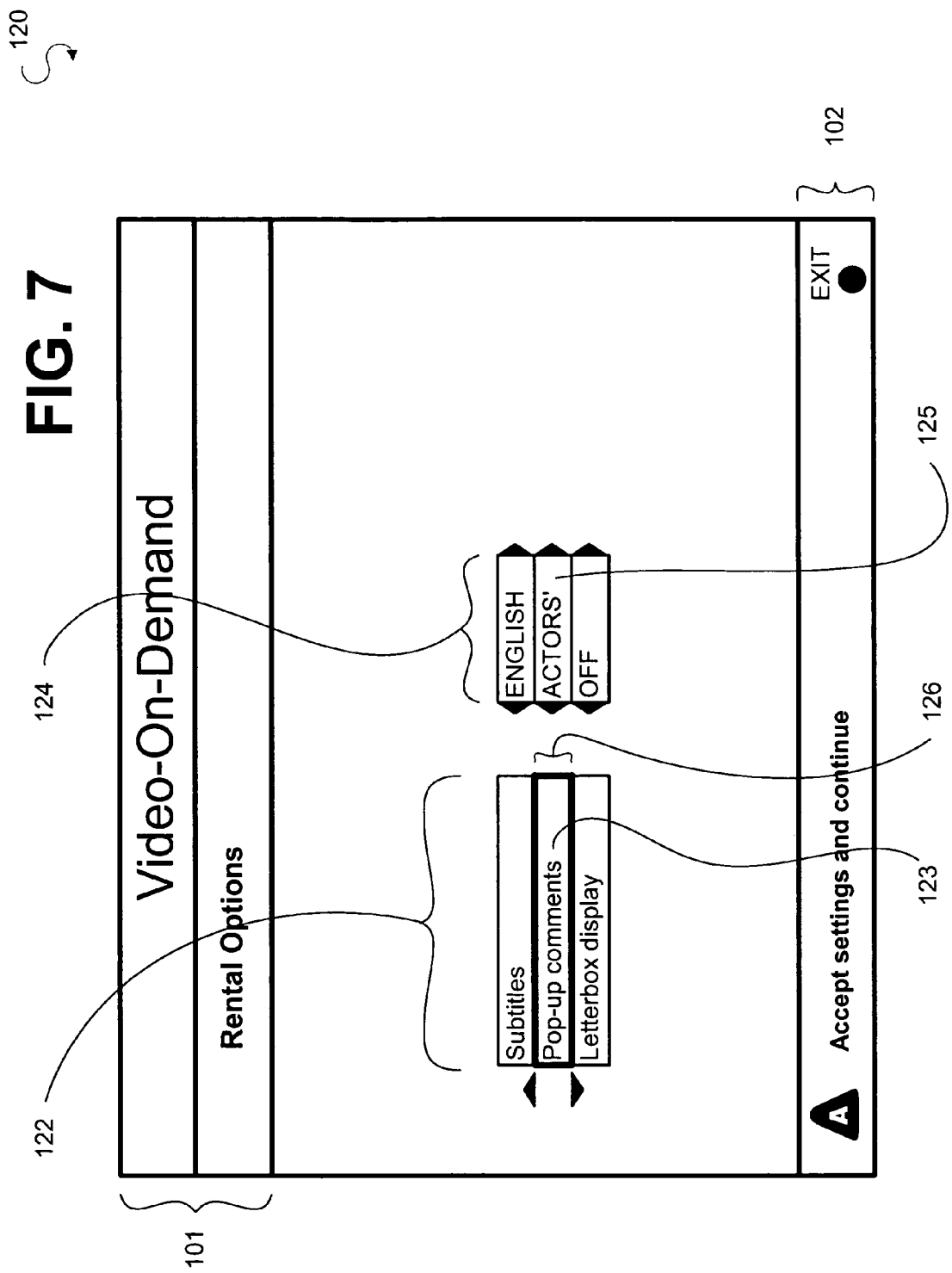
FIG. 7 depicts an example rental options selection window that is presented to the user after the user selects a rental period via the rental period selection window shown in FIG. 6.

FIG. 7 depicts an example rental options selection window 120 that is presented to a user after the user selects a rental period via the rental period selection window 110. Rental options list 122 contains rental options, such as option 123, and a highlighted option area 126. The user may use the up and down arrows 83, 84 to designate a rental option as the highlighted rental option and may use the left and right arrow buttons 85, 86 in order to hop over to the setting list 125 and change the setting of the highlighted rental option 123. Example rental options include subtitles, pop-up comments, and letterbox display.

Information supplements such as pop-up comments settings may include comments from the director, the producer, actors, critics, or other viewers that are displayed at designated time intervals of the on-demand media presentation simultaneously with the on-demand media presentation.

Information supplements comprise media such as textual, graphical, video, or audio information, each to be presented as a single supplement or as a combined set of supplements with the VOD presentation. Information supplements comprise a specification of start time and duration interval in relation to the start of the on-demand title for which they are presented to the user or in relation to some other accessible starting point of the on-demand title such as a chapter. Herein such specification is referred to as the active time interval of the information supplement. An information supplement may exhibit one or more active time interval specifications during the course of the VOD title presentation. The time interval specification enables an information supplement to be presented to the user in a time-synchronized fashion.

Information supplements also comprise other specifications such as screen positioning relative to the picture display of the on-demand title enabling a supplement's respective presentation to overlay the picture display in a predetermined manner to minimize occlusion of the picture.

Popup alerts are optional graphical supplements such as arrows that point attention to inconspicuous parts of the on-demand video picture presentation. They possess active time interval and screen location specifications.

Auditory alerts are optional supplements that are mixed with the audio of the on-demand video program and possess active time interval designation of one or more speaker channels for which to mix the audio supplement, and volume specification.

Multiple video views are optional supplements that provide different camera angles of the media presentation. Their presentation is accomplished with a split-picture display presentation or a picture-in-picture (PIP) presentation. The specification for a multi-video view supplement comprises an active time interval, a screen position, and whether the presentation is effected as a split-screen or PIP supplement.

Advertisement pop-ups are optional supplements that enable the user to receive product information during the on-demand video presentation in exchange for a lower rental fee. The advertisements may be specific to products inherent during the course of the on-demand movie such as a watch worn by a leading actor. Furthermore, the advertisement supplement's active time interval may be concurrent to the time in the movie that the leading actor reads the time on the watch.

Upon a user setting an optional request for one or more information supplements, the MOD client application 63 initiates processor 44 to enable data streams carrying information supplements corresponding to an on-demand video program to be received by demultiplexing system 200, to be transferred to the fourth part of DRAM assigned for reception of data. Supplementary textual or graphical data is then decoded, parsed and interpreted by processor 44 and/or other data parsing and interpretation device (not shown) in DHCT 16 and transferred into a graphics display buffer 240 as graphics data.

Alternatively, if the supplementary data or parts thereof comprise a digital audio component, it is decoded by a first digital audio decoding system 220 or a second digital audio decoding system (not shown) and the supplementary audio is transferred to an assigned Pulse Code Modulation (PCM) audio buffer 250 in DRAM 52. The audio player and output system 240 effects mixing of the supplementary audio stored in the PCM buffer with the designated audio channel of the reconstructed digital audio of the on-demand video program stored in the sixth part of DRAM 52.

Alternatively, if the supplementary data or parts thereof comprise a digital video component, it is received as a video stream of the on-demand video program and processed in DHCT 16 as described above, each processing operation is performed by an aforementioned first processing component in DHCT 16, respectively, or a similar second processing component in DHCT 16 (not shown).

A supplementary video picture may be decompressed by digital video decoding system 210 and scaled down as it is being reconstructed in a procedural fashion with video scaling unit 260 to effect a picture in picture presentation. The scaled down reconstructed picture can be stored in a scaled video picture buffer 270 in DRAM 52. Simultaneous display of the on-demand video picture with a supplementary scaled down video picture 270 can be constructed with supplementary graphical and textual information stored in graphics display buffer 240.

Downscaled video pictures overlay on-demand video presentation by the composition capabilities of DHCT 16 (not shown) and positioned (likely at a corner of screen) as specified by the information supplement specification and only visible during the respective specified active time interval.

Graphical and textual data corresponding to a pop-up supplement overlay the on-demand video presentation on designated screen location per their respective specification and are only visible during their respective specified active time interval The DHCT 16 has an internal clock 280 and timers 290 that enable computation of the time relationship between its internal clock and clock specified by digital video program. Hence, by reading and interpreting the clock and time stamps specifications intrinsic in the digital video program (for example, as provisioned in MPEG-2), DHCT 16 can effect an output as a synchronized presentation to the user that includes the reconstructed on-demand video pictures, the reconstructed digital audio samples, and supplementary information.

Figure 8:
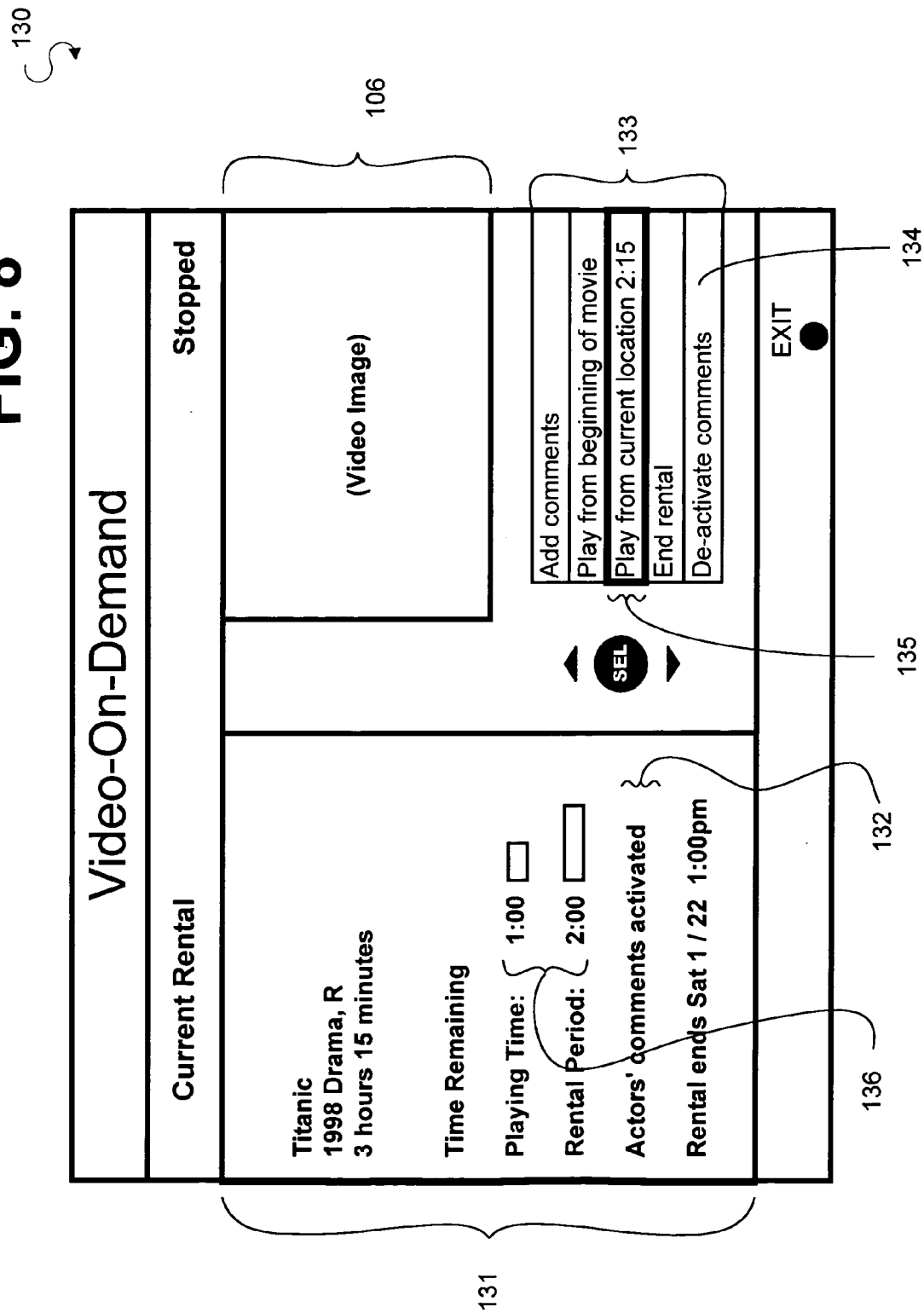
FIG. 8 depicts a stopped video window that is presented to a user after the user stops a media presentation, containing added comments, that was being provided to the user by the DHCT depicted in FIG. 3.

FIG. 8 depicts an example stopped video window 130 that is presented to the user after the user stops the presentation of a video rental for which actors' pop-up comments had been activated. The reduced screen area 106 displays an image from the media rental that was being presented to the user prior to example window 130 being displayed. Information section 131 contains information related to the media rental associated with the image displayed in the reduced screen area 106, including numerical and graphical indications 136 as to the playing time and rental time remaining for the media rental. Rental control options list 133 contains rental control options, such as the option to "De-activate comments" 134, and a highlighted option area 135. A user can de-activate pop-up comments by selecting the "De-activate comments" option 134 via the remote control device 80. Once this option is selected, the "Actor's comments activated" message 132 is replaced with a message indicating that pop-up comments have been de-activated, and pop-up comments are no longer presented to the user during the remainder of the rental period unless the user subsequently requests otherwise.

Figure 9:
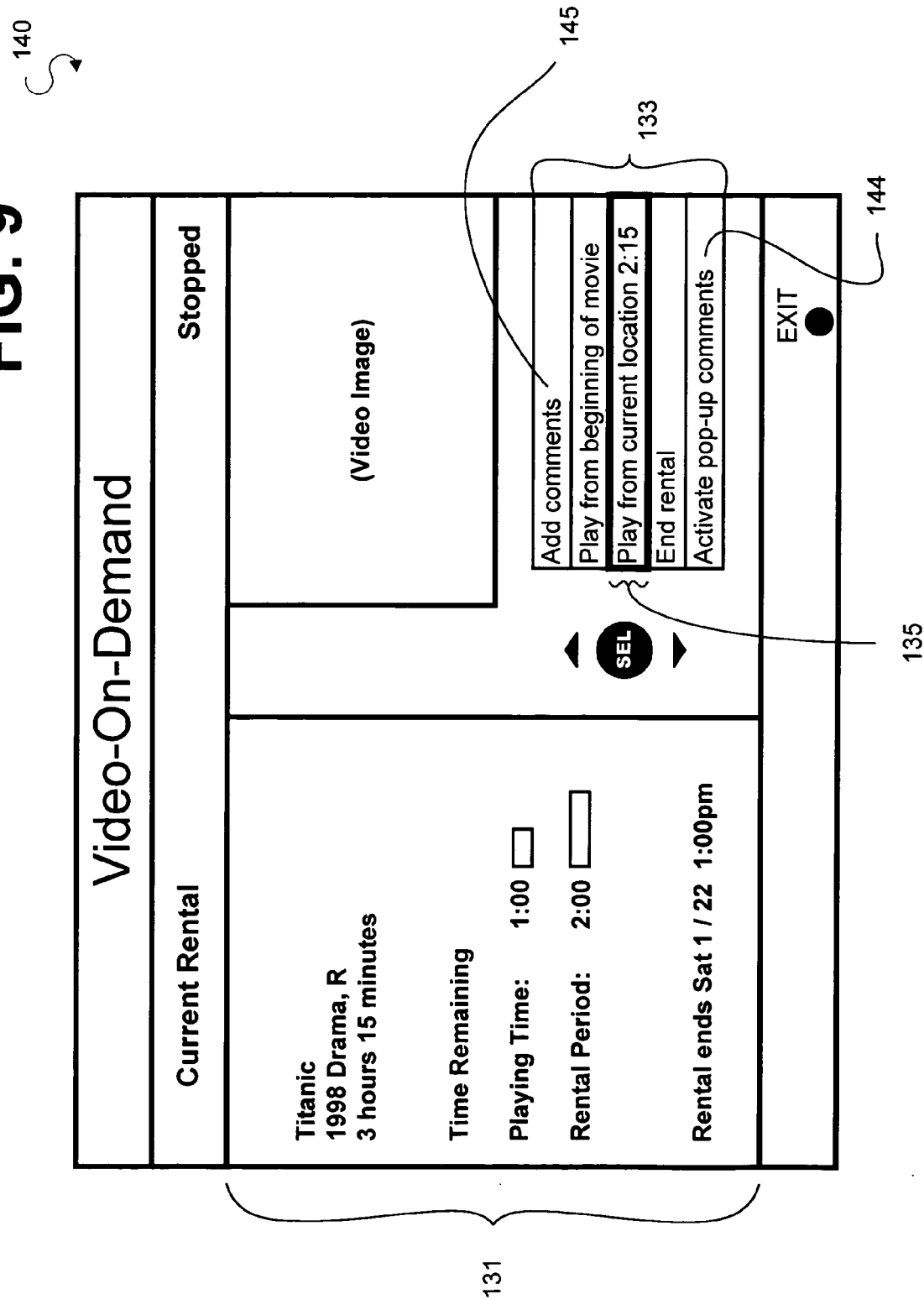
FIG. 9 depicts a stopped video window that is presented to a user after the user stops a media presentation, containing no added comments, that was being provided to the user by the DHCT depicted in FIG. 3.

FIG. 9 depicts an example stopped video window 140 that is presented to the user after the user stops the presentation of a video rental for which pop-up comments are not activated. Rental control options list 133 contains rental control options, such as the option to "Activate pop-up comments" 144, and a highlighted option area 135. A user can activate pop-up comments by selecting the "Activate pop-up comments" option 144 via the remote control device 80. In one embodiment, the user may select an "Add comments" option 145 which enables the user to add comments to the rental selection via the keyboard 73 (FIG. 3) or via an infra-red keyboard (not shown). Comments added by a user during a video presentation are displayed on the television 41 and are stored by the MOD client application 63 in the application memory 70. Once the rental period expires, user comments are transmitted by the MOD client application 63 to the MOD server application 19 (FIG. 2) which edits them (if necessary), integrates them with comments from other users associated with the same video title, and stores them in memory (not shown) at the headend 11. User comments may be edited for things such as vulgar language and excessive length. Integrated user comments associated with a specific media rental may then be presented to a subsequent user who request such comments along with the media rental. In one embodiment, user comments are edited or screened by a system operator.

Figure 10:
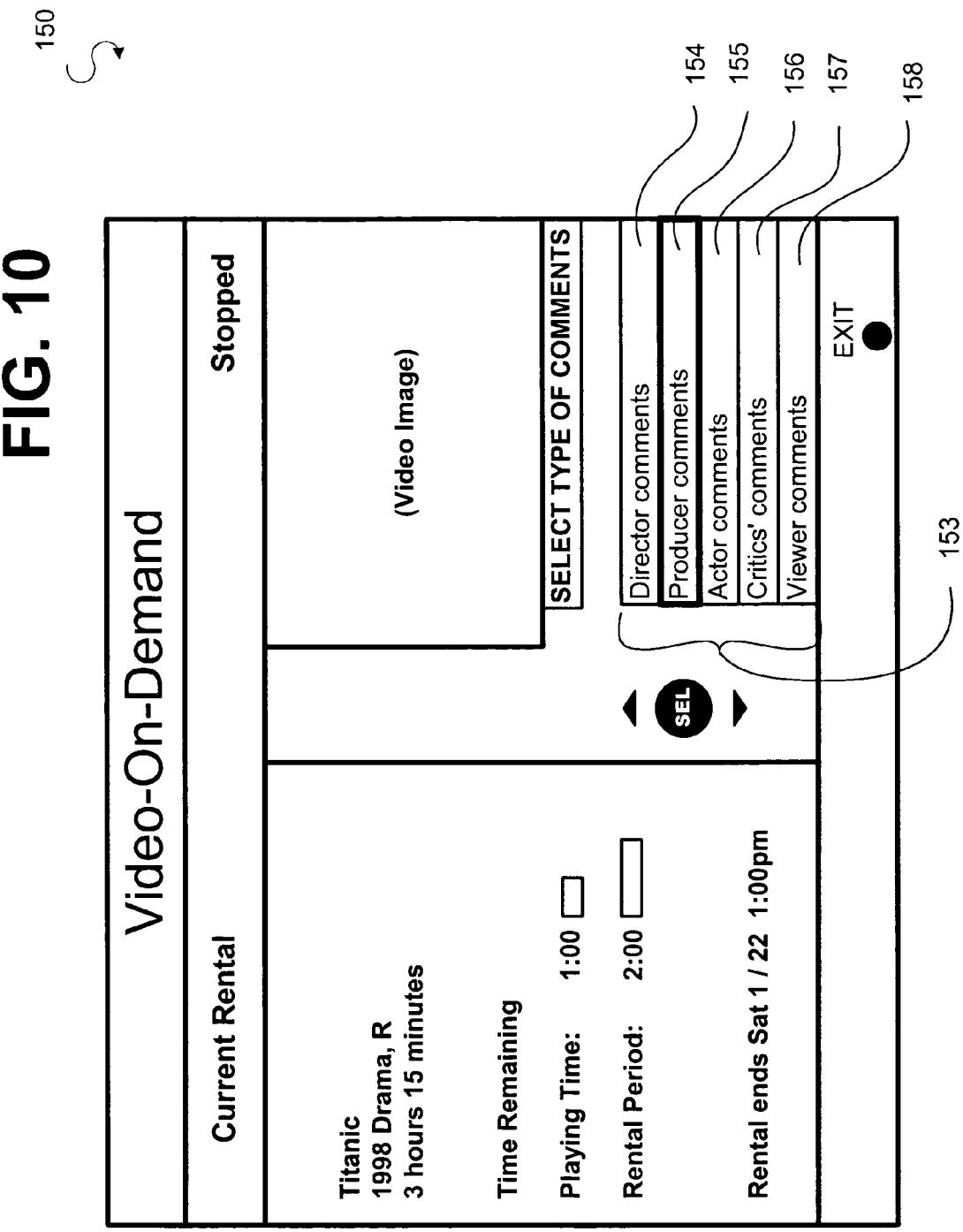
FIG. 10 depicts a comments selection window after the user requests added comments via the stopped video window depicted in FIG. 9.

FIG. 10 depicts an example pop-up comments selection window 150 that is presented to the user after the user selects the "Activate pop-up comments" option 144 via stopped video window 140. Pop-up comments selection list 153 contains pop-up comments types such as director's comments 154, producer's comments 155, actors' comments 156, critics' comments 157, and viewers' comments 158.

Once the user selects the type of comments that the user desires to view along with the video rental, such comments are displayed with the video rental the next time that the video rental is presented to the user, unless the user subsequently requests otherwise. The comments may be displayed at the bottom of the television screen or may be proximally located to a displayed item or actor to which/whom the comments respectively pertain.

It should be emphasized that the above-described embodiments of the present invention, particularly any "preferred embodiments", are merely possible examples of the implementations, merely setting forth a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

Therefore, having thus described the invention, the following is claimed:

1. A method implemented by a television set-top-terminal ("STT") configured to receive a video program from a remote server, the method comprising:

storing by the STT a plurality of streams corresponding to the video program from the remote server, the plurality of streams including a first set of streams and a supplementary data stream that is different than the streams in the first set of streams, the first set of streams including at least an audio stream and a video stream, the supplementary data stream corresponding to supplementary information;

providing a first selectable option to receive the video program from a plurality of video programs;

receiving a first viewer input from a viewer, the first viewer input being configured to select the first selectable option;

responsive to receiving the first viewer input, providing a second selectable option to receive the supplementary data stream in the STT, wherein the second selectable option is first provided after receipt of the first viewer input and as a direct result of receiving the first user input, wherein the second selectable option is associated with an option to display on-screen comments, and wherein the supplementary data stream comprises on-screen comments, the on-screen comments including comments from a director, a producer, an actor, a critic, and at least one other viewer;

receiving a second viewer input from the viewer responsive to providing the second selectable option;

responsive to receiving the second viewer input corresponding to selecting the second selectable option, providing a third selectable option to select on-screen comments from one of a director, a producer, an actor, a critic, and at least one other viewer, receiving a third viewer input from the viewer responsive to providing the third selectable option, communicating with the remote server by the STT via a first transmission frequency channel to receive the plurality of streams, receiving a respective sequential portion of each stream in the plurality of streams substantially simultaneously via a tuner in the STT tuned to the first transmission frequency channel, storing the sequential portions of the supplementary data stream and each stream in the first set of streams into respective sections of a memory in the STT, and presenting the sequential portions of the supplementary data stream and the audio stream and the video stream of the video program in the first set of streams in their respective decoded form simultaneously at a plurality of respective time intervals corresponding to respective portions of the video program; and responsive to receiving the second viewer input corresponding to a viewer input that is different than a viewer input corresponding to selecting the second selectable option, receiving a respective sequential portion of each stream in the plurality of streams substantially simultaneously via a tuner in the STT tuned to the first transmission frequency channel, rejecting the supplementary data stream at the STT, storing the sequential portions of each stream of the first set of streams into respective sections of the memory in the STT, and presenting the sequential portions of the audio stream and the video stream of the video program of the first set of streams in their respective decoded form simultaneously at a plurality of respective time intervals corresponding to respective portions of the video program.

2. The method of claim 1, wherein presenting the supplementary data stream during the plurality of respective time intervals corresponds to the appearance time of a visual object contained in the video program.

3. The method of claim 1, wherein presenting the sequential portions of the supplementary data stream at a plurality of respective time intervals corresponding to respective portions of the video program includes presenting a time-synchronized composition of the supplementary data stream and the video program according to time stamp specifications.

4. The method of claim 3, wherein at least a portion of the supplementary data stream and at least the respective sequential portion of each stream in the plurality of streams are presented by the STT as a television signal.

5. The method of claim 1, wherein the video program comprises a video-on-demand ("VOD") program established over a dedicated network session between the remote server and the STT.

6. The method of claim 1, wherein at least a portion of the supplementary data stream and at least a respective portion of each stream in the first set of streams are received substantially simultaneously by the STT from a single tuned transmission channel via the tuner in the STT.

7. The method of claim 6, wherein the transmission frequency channel is a radio-frequency channel with a specified center frequency, wherein data carried in the transmission channel is modulated via quadrature amplitude modulation (QAM).

8. The method of claim 1, wherein the supplementary data stream, audio stream, and video stream are encrypted and transmitted over the same transmission frequency channel.

9. The method of claim 1, wherein presenting the sequential portions of the supplementary data stream at a plurality of respective time intervals is in relation to a starting point in the video program, the starting point being a video chapter.

10. The method of claim 1, wherein at least one portion of the supplementary data stream is associated with and presented during a first interval and a second interval of the presentation of the video program.

11. The method of claim 1, wherein responsive to receiving the second viewer input corresponding to selecting the second selectable option further comprises:

configuring a rental viewing period and the initial transmission to the STT of the video program and the supplementary data stream via the first transmission frequency channel;

receiving the initial transmission of the video program and the supplementary data stream in the STT during the rental viewing period via a tuner in the STT tuned to the first transmission frequency channel; and presenting a respective portion of the initial transmission of the video program and the supplementary data stream simultaneously at a plurality of respective time intervals corresponding to respective portions of the video program.

12. The method of claim 1, wherein the video program corresponds to a single consumable version of the video program in the remote server, the consumable version of the video program corresponding to the released form of the video program, the plurality of streams corresponding to an entirety of the stored video program.

13. The method of claim 1, wherein the first selectable option is associated with a video title.

14. The method of claim 1, further comprising:
responsive to receiving the second viewer input corresponding to selecting the second selectable option,
presenting an indication that the option to display on-screen comments has been activated,
receiving a third viewer input for de-activating the on-screen comments, and
rejecting the supplementary data stream at the STT.

15. The method of claim 1, further comprising:
responsive to receiving the second viewer input corresponding to a viewer input that is different than a viewer input corresponding to selecting the second selectable option,
presenting an indication that the option to display on-screen comments has been de-activated,
receiving a third viewer input for activating the on-screen comments, and
presenting the sequential portions of the originally rejected supplementary data stream in its decoded form at a plurality of respective time intervals corresponding to respective portions of the video program.

16. The method of claim 1, further comprising enabling the viewer to add comments.

17. The method of claim 16, further comprising:
receiving and storing comments added by the viewer; and
transmitting the comments added by the viewer to the remote server after the sequential portions of the supplementary data stream and the audio stream and video stream of the video program have been presented.

* * * * *